(12) United States Patent
Lu et al.

(10) Patent No.: US 11,290,048 B2
(45) Date of Patent: Mar. 29, 2022

(54) METHOD AND APPARATUS FOR ADAPTIVE CONTROL OF MOTOR, AND STORAGE MEDIUM

(71) Applicant: AAC Technologies Pte. Ltd., Singapore (SG)

(72) Inventors: Xiang Lu, Shenzhen (CN); Zheng Xiang, Shenzhen (CN); Yajun Zheng, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 16/941,573

(22) Filed: Jul. 29, 2020

(65) Prior Publication Data
US 2021/0044237 A1    Feb. 11, 2021

(30) Foreign Application Priority Data
Aug. 9, 2019   (CN) .......................... 201910735381.0

(51) Int. Cl.
*H02P 23/14* (2006.01)
*G05B 13/04* (2006.01)
*G06F 17/13* (2006.01)
*H02P 23/00* (2016.01)

(52) U.S. Cl.
CPC ............ *H02P 23/14* (2013.01); *G05B 13/042* (2013.01); *G06F 17/13* (2013.01); *H02P 23/0018* (2013.01)

(58) Field of Classification Search
CPC .............................. H02P 23/14; G05B 13/042
USPC .............................. 318/400.09, 400.01, 700
See application file for complete search history.

(56) References Cited

U.S. PATENT DOCUMENTS

| | | | |
|---|---|---|---|
| 7,294,988 B2 * | 11/2007 | Ajima | B60L 50/16 318/712 |
| 7,977,842 B2 * | 7/2011 | Lin | H02K 11/20 310/184 |
| 8,395,336 B2 * | 3/2013 | Lai | H02P 21/0089 318/400.02 |

* cited by examiner

*Primary Examiner* — David Luo
(74) *Attorney, Agent, or Firm* — W&G Law Group

(57) ABSTRACT

A method for adaptive motor control includes acquiring current parameters in an operation process of the motor at a current moment; determining a type of a region in which the motor operates at the current moment according to the current parameters; triggering a corresponding motor model according to the type of the region in which the motor operates at the current moment; and inputting the current parameters into the corresponding motor model, generating control parameters for motor operation according to the current parameters, and controlling the operation of the motor according to the control parameters for motor operation. An apparatus and a computer-readable storage medium are also disclosed. In comparison with the conventional motor control which uses the single nonlinear model, the motor control method disclosed herein can greatly improve the reliability of the control.

17 Claims, 5 Drawing Sheets

METHOD AND APPARATUS FOR ADAPTIVE CONTROL OF MOTOR, AND STORAGE MEDIUM

TECHNICAL FIELD

The present disclosure relates to the field of motor control, and in particular to a method and an apparatus for adaptive control of a motor, and to a storage medium.

BACKGROUND

Conventionally, if a motor is to be controlled to operate perfectly, an accurate motor model needs to be known. Because the physical model of existing motors cannot completely adopt the widely used linear model, a nonlinear model is generally used which approximates the physical model of the motor. However, there are many problems in the construction and implementation of the nonlinear model. For example, in constructing the model of the motor, it can be quite difficult to ensure the consistency between the physical model and constructed nonlinear model of the motor, which may lead to a poor reliability of the nonlinear model; secondly, in measuring parameters of the motor, it can be difficult to measure nonlinear parameters, and the measured values are only approximate values. Therefore, when a mathematical model is used for expressing the real motor, it certainly approximates the real motor, and the only difference lies in how close it approximates the real motor, which makes it difficult to ensure the accuracy of the model.

Therefore, it is necessary to provide a method which can adapt to the nonlinear control of the motor, so as to realize nonlinear control of the motor.

SUMMARY

In one independent aspect, a method for adaptive control of a motor generally includes a data acquisition step of acquiring current parameters in an operation process of the motor at a current moment; a determination step of determining a type of a region in which the motor operates at the current moment according to the current parameters; a triggering step of triggering a corresponding motor model according to the type of the region in which the motor operates at the current moment; and a controlling step of inputting the current parameters into the corresponding motor model, generating control parameters for motor operation according to the current parameters, and controlling the operation of the motor according to the control parameters for motor operation.

In some embodiments, the type of the region in which the motor operates at the current moment includes a linear region and a nonlinear region, and when it is determined that the type of the region in which the motor operates at the current moment is the linear region, a linear model is triggered and the method proceeds to a linear control step; and when it is determined that the type of the region in which the motor operates at the current moment is the nonlinear region, a neural network model is triggered and the method proceeds to a nonlinear control step.

In some embodiments, the linear control step includes inputting the current parameters into the linear model to obtain the control parameters for motor operation, and controlling the operation of the motor according to the control parameters for motor operation; and the nonlinear control step includes inputting the current parameters into the neural network model to obtain the control parameters for motor operation, and controlling the operation of the motor according to the control parameters for motor operation.

In some embodiments, the neural network model may include a time delay neural network model.

In some embodiments, training the time delay neural network model may include acquiring individual parameters in the operation process of the motor from historical data, wherein the individual parameters are taken as parameters of input layer nodes of the time delay neural network model; acquiring control parameters in the operation process of the motor from historical data, wherein the control parameters are taken as parameters of output layer nodes of the time delay neural network model; and determining the coefficient of each hidden layer node of the time delay neural network model using a back propagation algorithm, and training the time delay neural network model.

In some embodiments, the current parameters in the operation process of the motor at the current moment may include a displacement of a motor vibrator at the current moment, and the determination step may include comparing the displacement of the motor vibrator at the current moment with a corresponding displacement threshold set by a system; and determining the type of the region in which the motor operates at the current moment according to a result of the comparison between the displacement of the motor vibrator at the current moment and the displacement threshold.

In some embodiments, the data acquisition step may include predicting the displacement of the motor vibrator at the current moment by adopting the linear model upon initial control by the system or when the motor operates in the linear region; and predicting the displacement of the motor vibrator at the current moment by adopting the neural network model when the motor operates in the nonlinear region.

In some embodiments, the linear model may adopt a second-order physical model, a differential equation of which is as follows:

$$\sum \begin{matrix} u = R_e i + \frac{d(L(x)i)}{dt} + b(x)\frac{dx}{dt} \\ b(x)i = m\frac{d^2 x}{dt^2} + R_m \frac{dx}{dt} + k(x)x - L_x(x)\frac{i^2}{2} \end{matrix}.$$

In another independent aspect, an apparatus for adaptive control of a motor generally includes a processor and a memory in communication with the processor. The memory has a motor control program stored thereon. The motor control program is executable by the processor to perform the method for adaptive control of a motor as described above.

In still another independent aspect, a computer-readable storage medium is provided which has a motor control program stored thereon. The motor control program is executable by a processor to perform the method for adaptive control of a motor as described above.

In summary, a double-model-switching based motor control method is disclosed. When the motor operates in the linear region, the motor is controlled using the linear model. When the motor operates in the nonlinear region, the motor is controlled using the neural network model in place of the linear model. Embodiments of the present disclosure can automatically select a corresponding model for motor control based on the region in which the motor operates. In comparison with the conventional motor control which uses a single nonlinear model, the motor control method disclosed herein can greatly improve the reliability of the control.

Independent features and/or independent advantages of this disclosure may become apparent to those skilled in the art upon review of the detailed description, claims and drawings.

BRIEF DESCRIPTION OF THE DRAWINGS

In order to explain the technical solutions of the embodiments of the present disclosure more clearly, accompanying drawings used to describe the embodiments are briefly introduced below. It is evident that the drawings in the following description are only concerned with some embodiments of the present disclosure. For those skilled in the art, in a case where no inventive effort is made, other drawings may be obtained based on these drawings.

DESCRIPTION OF THE EMBODIMENTS

The present disclosure will be described further below with reference to the accompanying drawings and embodiments.

First Embodiment

Figure 1:
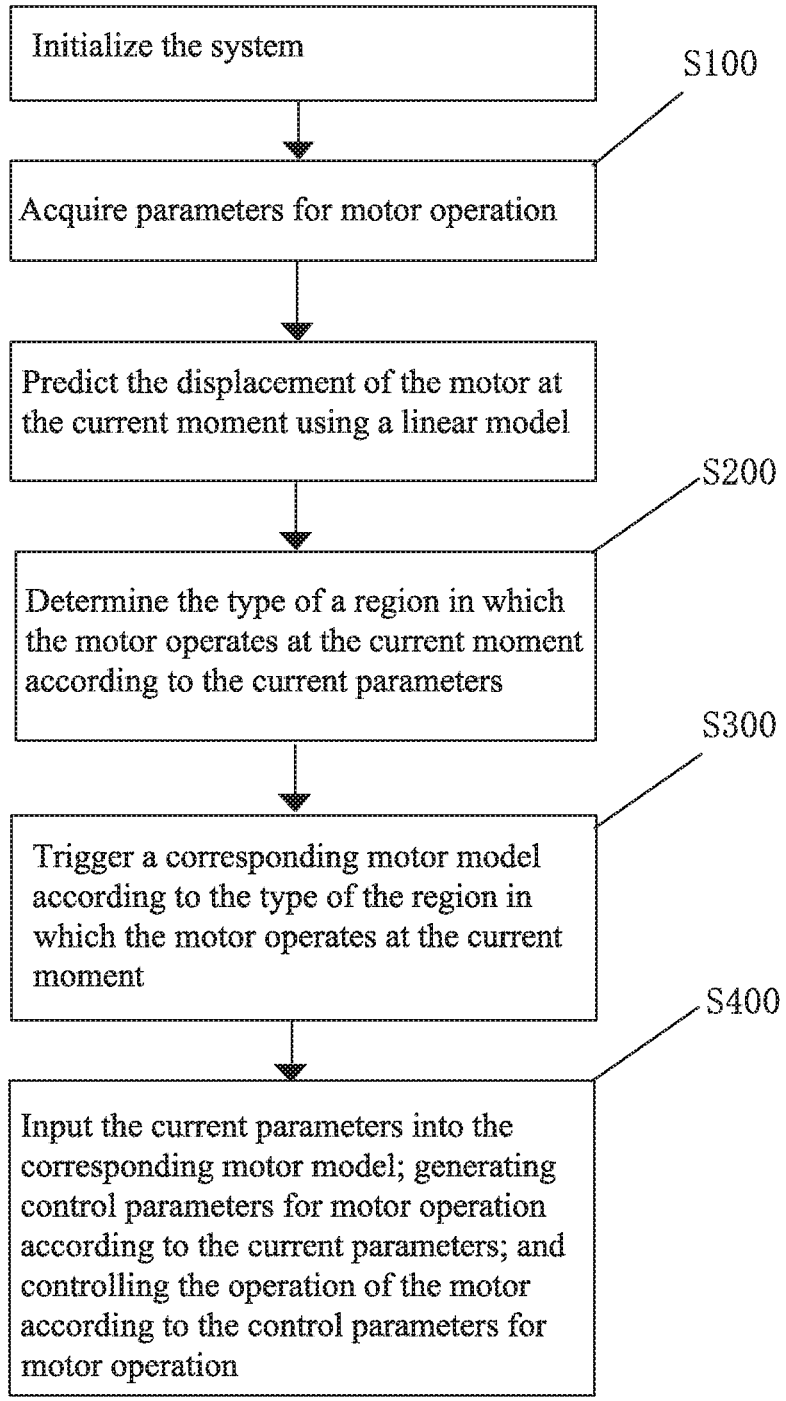
FIG. 1 is a flowchart of a method for adaptive control of a motor according to one embodiment.
Figure 2:
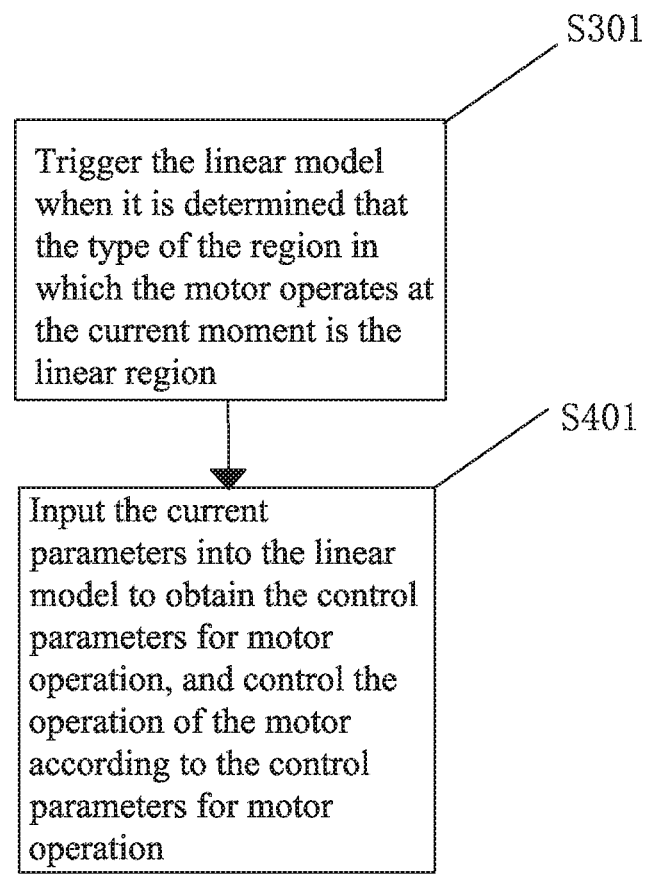
FIG. 2 is a flowchart of control of a linear model according to one embodiment.
Figure 3:
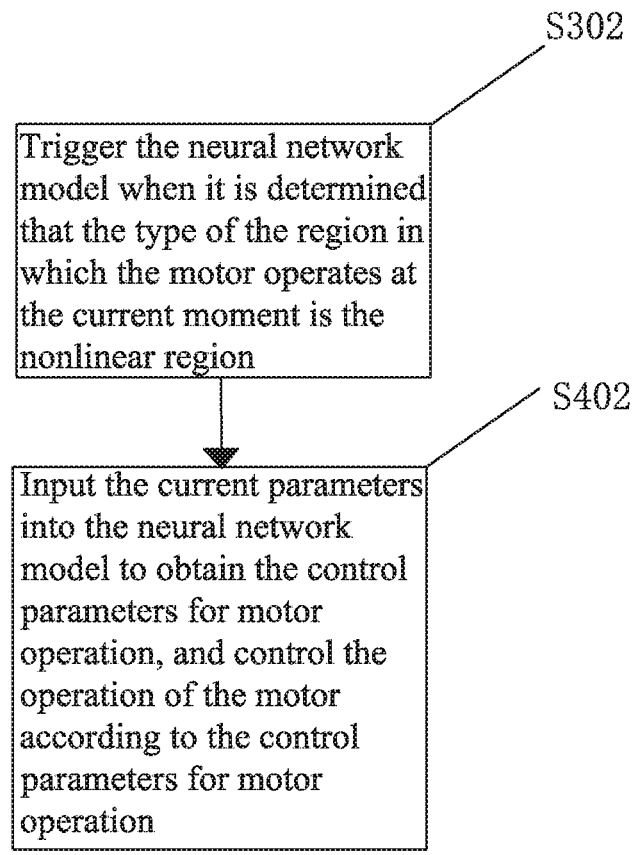
FIG. 3 is a flowchart of control of a neural network model according to one embodiment.
Figure 4:
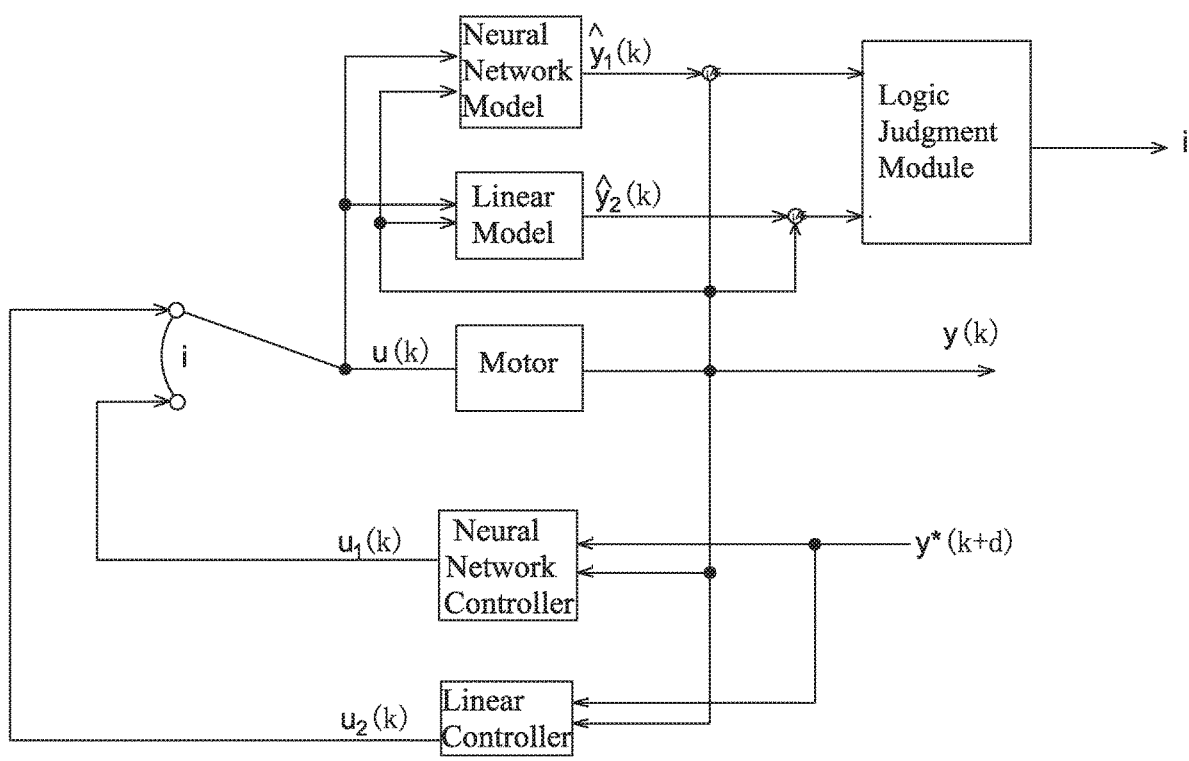
FIG. 4 is a diagram showing the logic parameter variation of the method for adaptive control of a motor according to one embodiment.

As shown in FIGS. 1-3, the present disclosure provides a method for adaptive control of a motor, which controls the motor based on double model switching. As shown in FIG. 4, it is a diagram showing the logic parameter variation in the motor control of the present disclosure. A neural network model and a linear model are used as observers of the motor to calculate the control parameters of the motor according to individual parameters in the operation process of the motor.

A neural network controller and a linear controller are used as controllers of the motor to receive the control parameters of the motor as calculated by the neural network model and the linear model, thus realizing the control of the motor.

In the present disclosure, the motor is controlled based on double model switching. Therefore, during operation of the motor, a logic judgment module shown in FIG. 4 is used to judge an operation region of the motor in real time, and automatically select whether the neural network model or the linear model is to be used for calculation of the control parameters of the motor according to a judgment result, thereby realizing nonlinear or linear control of the motor.

That is, the linear model is triggered when the motor operates in a linear region, and at this time, individual parameters in the operation process of the motor are input into the linear model to obtain the control parameters of the current motor, which are in turn inputted into the linear controller to realize the linear control of the motor.

In the present disclosure, the linear control of the motor is realized by adding the linear model, which improves the robustness of the system. The linear model adopts a traditional second-order physical model, a differential equation of which is as follows:

$$\sum \begin{matrix} u=R_e i + \frac{d(L(x)i)}{dt} + b(x)\frac{dx}{dt} \\ b(x)i = m\frac{d^2 x}{dt^2} + R_m \frac{dx}{dt} + k(x)x - L_x(x)\frac{i^2}{2} \end{matrix}, \quad (1)$$

where m is the mass, and k is a stiffness coefficient.

The neural network model is triggered when the motor operates in a nonlinear region. At this time, individual parameters in the operation process of the motor are input into the neural network model to obtain the current control parameters of the motor, and then the current control parameters of the motor are input into the neural network controller to realize the nonlinear control of the motor.

The neural network model adopted in the present disclosure is obtained through training. That is to say, the neural network model adopted in the present disclosure adopts a time delay neural network model (TDNN model for short).

The specific training process of the TDNN model is as follows.

In an input layer of the TDNN model, each input node corresponds to the sampling point at each moment, that is, the input data of each input node is the parameters in the operation process of the motor as detected at each moment, and the motor model is obtained through the calculation of multiple hidden layers.

In order to realize the nonlinear control of the motor by using the neural network model, it is also necessary to optimize the parameters of each layer. In the present disclosure, a back propagation algorithm and a softmax function (also called a normalized exponential function) are used as methods for gradient calculation to realize optimization of the parameters of each layer.

That is to say, the training process of the TDNN model is as follows. Individual parameters in the operation process of the motor are derived from historical data and used as the input parameters of the neural network model, the control parameters for motor control are used as the output parameters of the neural network model, the back propagation algorithm is adopted to determine a coefficient of each hidden layer node in the neural network model, i.e., determine individual parameters of the neural network model, and the neural network model is trained to obtain a neural network model.

The architecture and training process of the neural network model are known in the art. In the present disclosure, the architecture and training of the neural network model is used to establish a model for expressing a relationship between individual parameters in the operation process of the motor and the control parameters of the motor, such that the control parameters of the motor can be obtained according to the individual parameters in the operation process of the motor at the current moment, thereby realizing the real-time control of the motor.

The neural network model is triggered when the motor operates into the nonlinear region, and the parameters in the operation process of the motor as detected at the current moment are inputted into the neural network model to obtain the control parameters of the motor, and then the operation of the motor is controlled through the neural network controller according to the calculated control parameters of the motor.

There are various methods for judging whether the motor operates in the nonlinear region.

In the present disclosure, a displacement estimation method is adopted to judge whether the motor operates in a nonlinear region or not.

That is, firstly, a displacement threshold of the motor operating in the linear region and a displacement threshold of the motor operating in the nonlinear region are evaluated by the system.

Then, in judging the region in which the motor operates, the real-time displacement of the motor at the current moment is compared with the corresponding displacement threshold, to judge whether the motor operates in the linear region or in the nonlinear region.

Furthermore, for the initial control, the system firstly designates a control mode, predicts the displacement of the motor using the linear model, and controls the operation of the motor by adopting a linear control strategy. The actual displacement of the motor is obtained in real time, and it is judged whether the region in which the motor operates is a linear region. If yes, then the linear control strategy is continually used to control the motor operation; and if not, the neural network model is triggered, and the motor operation is controlled by adopting a nonlinear control strategy.

The work of the motor is controlled by adopting the neural network control strategy if the motor operates in the nonlinear region, and the state of the motor is detected by using the neural network model. That is, the displacement of the motor is predicted in real time. When it is judged that the motor operates in the linear region according to the predicted displacement of the motor, the system automatically switches to the linear control strategy to control the motor, and the linear model is then used in place of the neural network model for predicting the state of the motor.

The operation of the motor is controlled by adopting the linear control strategy if the motor operates in the linear region, and the state of the motor is detected by using the neural network model. That is, the displacement for the motor is predicted in real time. When it is judged that the motor operates in the nonlinear region according to the predicted displacement of the motor, the system automatically switches to the neural network control strategy to control the motor, and the neural network model is used in place of the linear model for predicting the state of the motor. The above control runs in cycle until the system is stopped, thereby realizing reliable control of the motor.

In the present disclosure, double models are adopted to automatically adapt to the linear region and the nonlinear region for motor operation, so that each model can focus on the region where it is good at to control the motor, which can better control the motor. In comparison with the conventional motor control which uses the single nonlinear model, the motor control method disclosed herein can greatly improve the reliability of the control.

As shown in FIG. 1, a method for adaptive control of a motor includes the following steps.

At Step S100, current parameters in an operation process of the motor at the current moment are acquired. For example, various detecting devices are used to detect the current parameters in the operation process of the motor at the current moment. These parameters include, but are not limited to, the displacement of a motor vibrator in the operation process of the motor.

At Step S200, a type of a region in which the motor operates at the current moment is determined according to the current parameters.

Because of the different types of regions in which the motor operates, it is necessary to adopt different motor models to realize control of the motor in these regions.

At Step S300, a corresponding motor model is triggered according to the type of the region in which the motor operates at the current moment.

At Step S400, the current parameters are inputted into the corresponding motor model; control parameters for motor operation are generated according to the current parameters; and the operation of the motor is controlled according to the control parameters for motor operation.

The motor model includes the linear model and the neural network model. Therefore, referring to FIGS. 2 and 3, the details of steps S300 and S400 are as follows.

At step S301, the linear model is triggered when it is determined that the type of the region in which the motor operates at the current moment is the linear region.

At step S401, the current parameters are inputted into the linear model to obtain the control parameters for motor operation, and the operation of the motor is controlled according to the control parameters for motor operation.

At step S302, the neural network model is triggered when it is determined that the type of the region in which the motor operates at the current moment is the nonlinear region.

At step S402, the current parameters are inputted into the neural network model to obtain the control parameters for motor operation, and the operation of the motor is controlled according to the control parameters for motor operation.

Furthermore, in determining the type of the region in which the motor operates, the displacement of the motor vibrator is compared with the corresponding displacement threshold set by the system, and the type of the region in which the motor operates at the current moment is determined according to the comparison result.

Furthermore, because the type of the region in which the motor operates is unknown at the beginning of the system, the displacement of the motor vibrator at the current moment is predicted using the linear model upon the initial control by the system.

Second Embodiment

Figure 5:
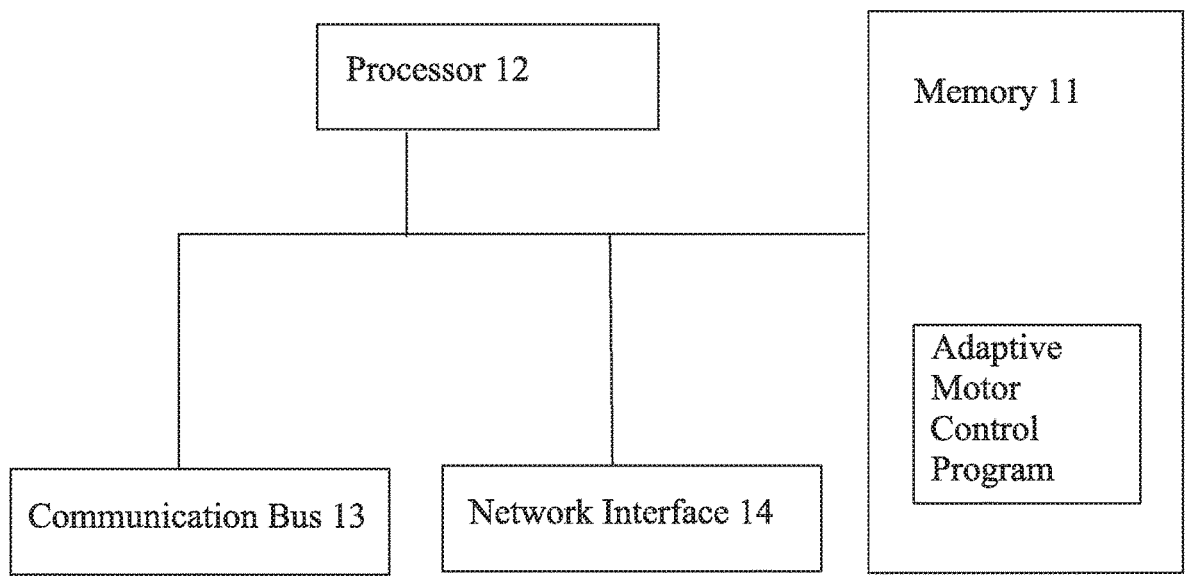
FIG. 5 is a block diagram illustrating an apparatus for adaptive control of a motor according to one embodiment.

The present disclosure provides an apparatus for adaptive control of a motor. FIG. 5 is a schematic diagram illustrating an internal structure of an apparatus for adaptive control of a motor according to an embodiment of the present disclosure.

In this embodiment, the apparatus for adaptive control of a motor may be a PC (Personal Computer), or a terminal device such as a smart phone, a tablet computer, and a portable computer. The apparatus for adaptive control of a motor at least includes a processor 12, a communication bus 13, a network interface 14, and a memory 11.

The memory 11 at least includes one type of readable storage medium, which includes a flash memory, a hard disk, a multimedia card, a card-type memory (e.g., a SD or DX memory, etc.), a magnetic memory, a magnetic disk, an optical disk, etc. In some embodiments, the memory 11 may be an internal storage unit of the apparatus for adaptive control of a motor, such as a hard disk of the apparatus for adaptive control of a motor. In some other embodiments, the memory 11 may also be an external storage device of the apparatus for adaptive control of a motor, such as a plug-in hard disk, a smart media card (SMC), a secure digital (SD) card, a flash card, etc. provided on the apparatus for adaptive control of a motor. Further, the memory 11 may also include both the internal storage unit and the external storage device of the apparatus for adaptive control of a motor. The memory 11 can be used not only for storing application software and various data installed in the apparatus for adaptive control of a motor, such as codes of the motor control program, but also for temporarily storing data that has been outputted or will be outputted.

In some embodiments, the processor 12 can be a central processing unit (CPU), a controller, a microcontroller, a microprocessor or other data processing chips, and is used for running program codes or processing data stored in the memory 11, such as executing the motor control program, etc.

The communication bus 13 is used for realizing communication between these components.

The network interface 14 may optionally include a standard wired interface or a wireless interface (e.g., a WI-FI interface), and is usually used for establishing a communication connection between the apparatus for adaptive control of a motor and other electronic devices.

Optionally, the apparatus for adaptive control of a motor may also include a user interface. The user interface may include a display and an input unit such as a keyboard, and the optional user interface may also include a standard wired interface and a wireless interface. Optionally, in some embodiments, the display may be an LED display, a liquid crystal display, a touch-sensitive liquid crystal display, an OLED (organic light-emitting diode) touch device, and the like. In this disclosure, the display can also be appropriately termed as a display screen or a display unit, which is used for displaying information processed in the apparatus for adaptive control of a motor, and displaying a visual user interface.

FIG. 5 only shows the components 11-14 and a motor control program of the apparatus for adaptive control of a motor. It should be understood by those skilled in the art that, the structures shown in FIG. 5 do not constitute a limit to the apparatus for adaptive control of a motor, and the apparatus for adaptive control of a motor may include fewer or more components than those shown, or a combination of some components, or have different component arrangements.

In the embodiment of the apparatus for adaptive control of a motor as shown in FIG. 5, a motor control program is stored in the memory 11. When the processor 12 executes the motor control program stored in the memory 11, the following steps are implemented:

data acquisition step S100: acquiring current parameters in an operation process of the motor at a current moment;

determination step S200: determining the type of a region in which the motor operates at the current moment according to the current parameters;

triggering step S300: triggering a corresponding motor model according to the type of the region in which the motor operates at the current moment; and controlling step S400: inputting the current parameters into the corresponding motor model; generating control parameters for motor operation according to the current parameters; and controlling the operation of the motor according to the control parameters for motor operation.

Further, the type of the region in which the motor operates at the current moment includes the linear region and the nonlinear region, and the determination step S300 includes:

step S301: triggering the linear model when it is determined that the type of the region in which the motor operates at the current moment is the linear region, and proceeding to a linear control step S401; and step S302: triggering the neural network model when it is determined that the type of the region in which the motor operates at the current moment is the nonlinear region, and proceeding to a nonlinear control step S402.

Further, in the linear control step S401, the current parameters are inputted into the neural network model to obtain the control parameters for motor operation, and the operation of the motor is controlled according to the control parameters for motor operation.

In the nonlinear control step S402, the current parameters are inputted into the neural network model to obtain the control parameters for motor operation, and the operation of the motor is controlled according to the control parameters for motor operation.

In some embodiments, the neural network model is a time delay neural network model.

In some embodiments, the step of training the time delay neural network model includes:

acquiring individual parameters in the operation process of the motor from historical data, wherein the individual parameters are taken as the parameters of input layer nodes of the time delay neural network model;

acquiring control parameters in the operation process of the motor from historical data, wherein the control parameters are taken as the parameters of output layer nodes of the time delay neural network model; and determining the coefficient of each hidden layer node of the time delay neural network model using a back propagation algorithm, and training the time delay neural network model.

Further, the current parameters in the operation process of the motor at the current moment include the displacement of a motor vibrator at the current moment, and the determination step S300 includes:

comparing the displacement of the motor vibrator at the current moment with a corresponding displacement threshold set by a system; and determining the type of a region in which the motor operates at the current moment according to a comparison result.

Further, the data acquisition step S100 includes:

predicting the displacement of the motor vibrator at the current moment by adopting the linear model upon initial control by the system or when the motor operates in the linear region; and predicting the displacement of the motor vibrator at the current moment by adopting the neural network model when the motor operates in the nonlinear region.

Further, the linear model adopts a second-order physical model.

Third Embodiment

Furthermore, one embodiment of the present disclosure also provides a storage medium, which is a computer-readable storage medium on which a motor control program is stored, and the motor control program can be executed by one or more processors to realize the following operations.

At Step S100, current parameters in an operation process of the motor at the current moment are acquired. For example, various detecting devices are used to obtain the current parameters in the operation process of the motor at the current moment. These parameters include, but are not limited to, the displacement of the motor vibrator in the operation process of the motor.

At Step S200, the type of a region in which the motor operates at the current moment is determined according to the current parameters.

Because of the different types of regions in which the motor operates, it is necessary to adopt different motor models to realize control of the motor in these regions.

At Step S300, a corresponding motor model is triggered according to the type of the region in which the motor operates at the current moment.

At Step S400: the current parameters are inputted into the corresponding motor model; control parameters for motor operation are generated according to the current parameters; and the operation of the motor is controlled according to the control parameters for motor operation.

The implementation of the storage medium of the present disclosure is basically the same as the above embodiments of the method and apparatus for adaptive control of the motor, and will not be described here in further detail.

Although the disclosure is described with reference to one or more embodiments, it will be apparent to those skilled in the art that various modifications and variations can be made to the disclosed structure and method without departing from the scope or spirit of the disclosure. In view of the foregoing, it is intended that the present disclosure cover modifications and variations of this invention provided they fall within the scope of the following claims and their equivalents.

What is claimed is:

1. A method for adaptive control of a motor, comprising:
    a data acquisition step of acquiring current parameters in an operation process of the motor at a current moment;
    a determination step of determining a type of a region in which the motor operates at the current moment according to the current parameters;
    a triggering step of triggering a corresponding motor model according to the type of the region in which the motor operates at the current moment; and
    a controlling step of inputting the current parameters into the corresponding motor model, generating control parameters for motor operation according to the current parameters, and controlling the operation of the motor according to the control parameters for motor operation,
    wherein the type of the region in which the motor operates at the current moment comprises a linear region and a nonlinear region, and
    when it is determined that the type of the region in which the motor operates at the current moment is the linear region, a linear model is triggered and the method proceeds to a linear control step; and
    when it is determined that the type of the region in which the motor operates at the current moment is the nonlinear region, a neural network model is triggered and the method proceeds to a nonlinear control step.

2. The method for adaptive control of a motor according to claim 1, wherein the linear control step comprises inputting the current parameters into the linear model to obtain the control parameters for motor operation, and controlling the operation of the motor according to the control parameters for motor operation; and
    the nonlinear control step comprises inputting the current parameters into the neural network model to obtain the control parameters for motor operation, and controlling the operation of the motor according to the control parameters for motor operation.

3. The method for adaptive control of a motor according to claim 2, wherein the neural network model comprises a time delay neural network model.

4. The method for adaptive control of a motor according to claim 3, wherein the method comprises a step of training the time delay neural network model, the step of training comprising:
    acquiring individual parameters in the operation process of the motor from historical data, wherein the individual parameters are taken as parameters of input layer nodes of the time delay neural network model;
    acquiring control parameters in the operation process of the motor from historical data, wherein the control parameters are taken as parameters of output layer nodes of the time delay neural network model; and
    determining the coefficient of each hidden layer node of the time delay neural network model using a back propagation algorithm, and training the time delay neural network model.

5. The method for adaptive control of a motor according to claim 2, wherein the current parameters in the operation process of the motor at the current moment comprise the displacement of a motor vibrator at the current moment, and the determination step comprises:
    comparing the displacement of the motor vibrator at the current moment with a corresponding displacement threshold set by a system; and
    determining the type of the region in which the motor operates at the current moment according to a result of the comparison between the displacement of the motor vibrator at the current moment and the displacement threshold.

6. The method for adaptive control of a motor according to claim 5, wherein the data acquisition step comprises:
    predicting the displacement of the motor vibrator at the current moment by adopting the linear model upon initial control by the system or when the motor operates in the linear region; and
    predicting the displacement of the motor vibrator at the current moment by adopting the neural network model when the motor operates in the nonlinear region.

7. The method for adaptive control of a motor according to claim 6, wherein the linear model adopts a second-order physical model, a differential equation of which is as follows:

$$\sum_{b(x)i=m\frac{d^2x}{dt^2}+R_m\frac{dx}{dt}+k(x)x-L_x(x)\frac{i^2}{2}}^{u=R_e i+\frac{d(L(x)i)}{dt}+b(x)\frac{dx}{dt}},$$

where m is a mass, and k is a stiffness coefficient.

8. An apparatus for adaptive control of a motor, comprising a processor and a memory in communication with the processor, the memory having a motor control program stored thereon, the motor control program being executable by the processor to perform a method for adaptive control of the motor, the method comprising:
    a data acquisition step of acquiring current parameters in an operation process of the motor at a current moment;
    a determination step of determining a type of a region in which the motor operates at the current moment according to the current parameters;
    a triggering step of triggering a corresponding motor model according to the type of the region in which the motor operates at the current moment; and a controlling step of inputting the current parameters into the corresponding motor model, generating control parameters for motor operation according to the current parameters, and controlling the operation of the motor according to the control parameters for motor operation, wherein the type of the region in which the motor operates at the current moment comprises a linear region and a nonlinear region, when it is determined that the type of the region in which the motor operates at the current moment is the linear region, a linear model is triggered and the method proceeds to a linear control step; and when it is determined that the type of the region in which the motor operates at the current moment is the nonlinear region, a neural network model is triggered and the method proceeds to a nonlinear control step.

9. The apparatus according to claim 8, wherein the linear control step comprises inputting the current parameters into the linear model to obtain the control parameters for motor operation, and controlling the operation of the motor according to the control parameters for motor operation; and the nonlinear control step comprises inputting the current parameters into the neural network model to obtain the control parameters for motor operation, and controlling the operation of the motor according to the control parameters for motor operation.

10. The apparatus according to claim 9, wherein the neural network model comprises a time delay neural network model, and the method comprises a step of training the time delay neural network model, the step of training comprising:

acquiring individual parameters in the operation process of the motor from historical data, wherein the individual parameters are taken as parameters of input layer nodes of the time delay neural network model;

acquiring control parameters in the operation process of the motor from historical data, wherein the control parameters are taken as parameters of output layer nodes of the time delay neural network model; and determining the coefficient of each hidden layer node of the time delay neural network model using a back propagation algorithm, and training the time delay neural network model.

11. The apparatus according to claim 9, wherein the current parameters in the operation process of the motor at the current moment comprise the displacement of a motor vibrator at the current moment, and the determination step comprises:

comparing the displacement of the motor vibrator at the current moment with a corresponding displacement threshold set by a system; and determining the type of the region in which the motor operates at the current moment according to a result of the comparison between the displacement of the motor vibrator at the current moment and the displacement threshold.

12. The apparatus according to claim 11, wherein the data acquisition step comprises:

predicting the displacement of the motor vibrator at the current moment by adopting the linear model upon initial control by the system or when the motor operates in the linear region; and predicting the displacement of the motor vibrator at the current moment by adopting the neural network model when the motor operates in the nonlinear region.

13. The apparatus according to claim 12, wherein the linear model adopts a second-order physical model, a differential equation of which is as follows:

$$\sum \begin{matrix} u = R_e i + \frac{d(L(x)i)}{dt} + b(x)\frac{dx}{dt} \\ b(x)i = m\frac{d^2x}{dt^2} + R_m\frac{dx}{dt} + k(x)x - L_x(x)\frac{i^2}{2} \end{matrix}$$

where m is a mass, and k is a stiffness coefficient.

14. A non-transitory computer-readable storage medium having a motor control program stored thereon, the motor control program being executable by a processor to execute a method for adaptive control of a motor, the method comprising:

a data acquisition step of acquiring current parameters in an operation process of the motor at a current moment;

a determination step of determining a type of a region in which the motor operates at the current moment according to the current parameters;

a triggering step of triggering a corresponding motor model according to the type of the region in which the motor operates at the current moment; and a controlling step of inputting the current parameters into the corresponding motor model, generating control parameters for motor operation according to the current parameters, and controlling the operation of the motor according to the control parameters for motor operation, wherein the type of the region in which the motor operates at the current moment comprises a linear region and a nonlinear region, when it is determined that the type of the region in which the motor operates at the current moment is the linear region, a linear model is triggered and the method proceeds to a linear control step; and when it is determined that the type of the region in which the motor operates at the current moment is the nonlinear region, a neural network model is triggered and the method proceeds to a nonlinear control step, wherein the linear control step comprises inputting the current parameters into the linear model to obtain the control parameters for motor operation, and controlling the operation of the motor according to the control parameters for motor operation; and the nonlinear control step comprises inputting the current parameters into the neural network model to obtain the control parameters for motor operation, and controlling the operation of the motor according to the control parameters for motor operation.

15. The non-transitory computer-readable storage medium according to claim 14, wherein the current parameters in the operation process of the motor at the current moment comprise the displacement of a motor vibrator at the current moment, and the determination step comprises:

comparing the displacement of the motor vibrator at the current moment with a corresponding displacement threshold set by a system; and determining the type of the region in which the motor operates at the current moment according to a result of the comparison between the displacement of the motor vibrator at the current moment and the displacement threshold.

16. The non-transitory computer-readable storage medium according to claim 15, wherein the data acquisition step comprises:

predicting the displacement of the motor vibrator at the current moment by adopting the linear model upon initial control by the system or when the motor operates in the linear region; and predicting the displacement of the motor vibrator at the current moment by adopting the neural network model when the motor operates in the nonlinear region.

17. The non-transitory computer-readable storage medium according to claim 16, wherein the linear model adopts a second-order physical model, a differential equation of which is as follows:

$$\sum \begin{matrix} u = R_e i + \frac{d(L(x)i)}{dt} + b(x)\frac{dx}{dt} \\ b(x)i = m\frac{d^2 x}{dt^2} + R_m \frac{dx}{dt} + k(x)x - L_x(x)\frac{i^2}{2} \end{matrix}.$$

where m is a mass, and k is a stiffness coefficient.

* * * * *